Figure 1:
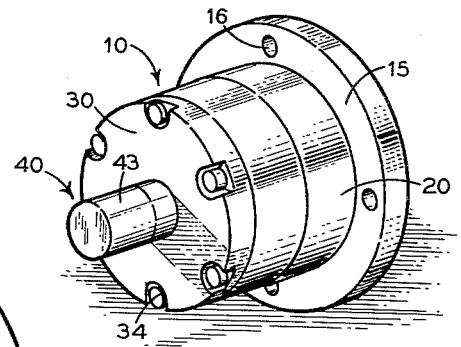

Aug. 14, 1962  F. REIMER ETAL  3,049,102
ROTARY ACTUATOR

Filed March 5, 1959  2 Sheets-Sheet 1

*INVENTORS*
Frederick Reimer
George Hirschberger
BY
*Irving Seidman*
ATTORNEY

Aug. 14, 1962   F. REIMER ETAL   3,049,102
ROTARY ACTUATOR
Filed March 5, 1959   2 Sheets-Sheet 2
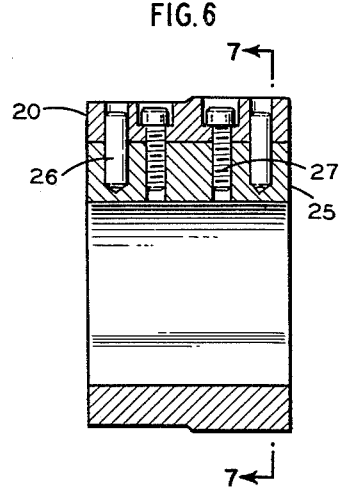
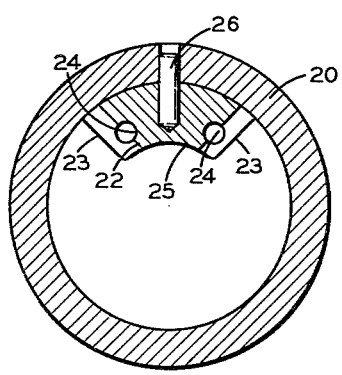
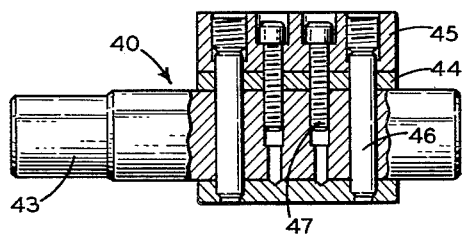
INVENTORS
Frederick Reimer
BY George Hirschberger
ATTORNEY United States Patent Office 3,049,102
Patented Aug. 14, 1962

3,049,102
ROTARY ACTUATOR
Frederick Reimer, Wantagh, and George Hirschberger, Syosset, N.Y., assignors to Parameters, Inc., New Hyde Park, N.Y., a corporation
Filed Mar. 5, 1959, Ser. No. 797,510
2 Claims. (Cl. 121—97)

This invention relates to rotary actuators, such used in servomotor control systems, and more particularly to a novel fluid pressure operated rotary actuator adaptable for direct driving without the interposition of gearing or mechanical linkage, and having high efficiency, zero backlash, low breakaway torque, high speed response, superior accuracy, and low size to output power ratio.

Servomotor systems of the mechanical, hydraulic, and pneumatic powered types have found widespread applications in many fields where remote positioning control is necessary or desirable. Among such applications are the positioning of control surfaces of aircraft, missiles, and nautical vessels, as well as the positioning of antennae. Other applications include analog computers and instrument control and indicating systems.

For angular positioning, a rotary type of actuator is frequently used. However, such rotary actuators have hitherto required the use of gear trains or lever systems for transmittal of sufficient operating power, particularly with relatively heavy loads. Such interposed gear trains and other mechanical linkages have had attendant disadvantages, such as gear back lash, friction, heavy maintenance expense, and the like. In addition, the gearing or linkage results in less than accurate angular positioning of the controlled elements, and frequently are characterized by excessive hunting and lack of stable positioning. The hydraulic and pneumatic systems have also required a large supply and flow of fluid, with resultant bulky conduits and relatively slow response to control signals.

In accordance with the present invention, the foregoing difficulties are avoided and accurate, stable angular positioning obtained by a fluid pressure operated rotary actuator of high power to size ratio and characterized by small pressure fluid requirements. The positioning accuracy, due to its ability to drive controlled elements directly, is limited only by the characteristics of the servomotor control valve and the transducer feedback system used therewith. The friction is substantially zero, and there are no rubber seals rubbing against moving parts. Hence, its response frequency is equal to that of the fluid pressure servo system with which it is used. The low rate of fluid flow permits the use of thin wall, small diameter tubing which can be run like electric wiring.

More particularly, the rotary actuator comprises a three-part casing including a circular mounting plate, a cylindrical body, and a circular cover plate, all formed of a ferritic alloy steel, such as Type 416 stainless steel. The two plates are pinned and bolted to opposite ends of the body and are coaxially apertured to receive a shaft of the same metal as the casing elements, this shaft having a fluid tight bearing fit in the coaxial apertures.

The shaft has pinned and bolted thereto a bushing or sleeve, having an axial length substantially equal to that of the housing, and an arcuate vane of the same axial length as the sleeve, the vane extending, for example, through an arc of 117 degrees. The outer radius of the vane is substantially equal to the inner radius of the body.

An arcuate stop is pinned and bolted on the inner surface of the body, and has an axial length equal to that of the body and an arcuate extent of the order of 90 degrees, for example. The circumferentially spaced ends of this stop are formed with substantially rectangular, relatively shallow recesses of less axial length than that of the body. The mounting plate has spaced fluid passages each extending therethrough and through one axial end of the stop to communicate each with a different recess.

The recessing of the arcuately spaced ends of the stop provides axially spaced abutments on each such end engaged by the outwardly bent ends of leaf springs clamped to the arcuately spaced ends of the vane cushioning the vane at each end of its arc of oscillation. Synthetic resin rings or washers are set in annular channels in the mounting and cover plate and bear against the vane.

Figure 2:
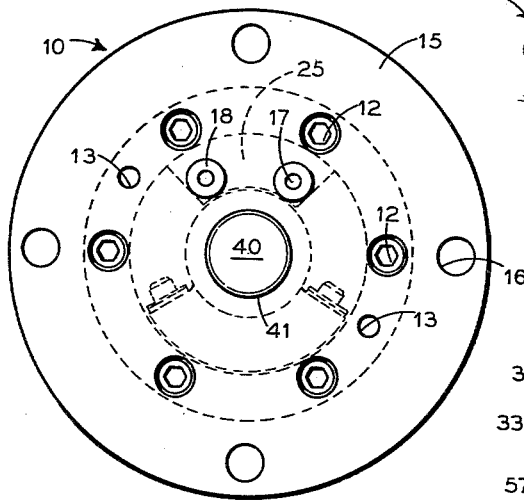
Figure 4:
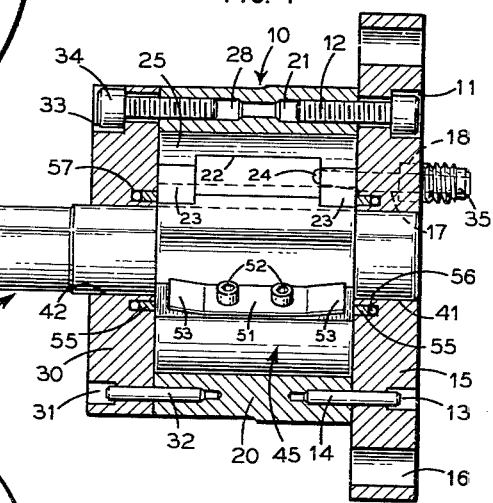
Figure 3:
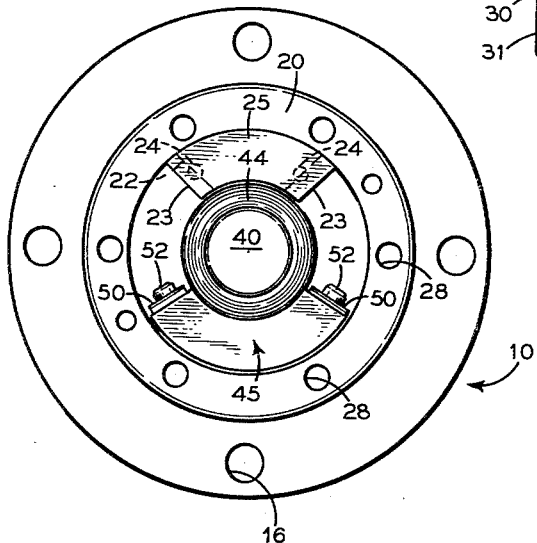

For an understanding of the invention principles, reference is made to the following description of a typical embodiment thereof as illustrated in the accompanying drawing. In the drawing:

FIG. 1 is a perspective view of a rotary actuator embodying the invention;
FIG. 2 is a bottom plan view thereof;
FIG. 3 is a top plan view thereof with the cover plate removed;
FIG. 4 is an axial section view therethrough;
FIG. 5 is an axial section of the shaft, bushing and vane;
FIG. 6 is an axial sectional view of the body and stop; and
FIG. 7 is a sectional view on the line 7—7 of FIG. 6.

Referring to FIGS. 1 through 4, the rotary actuator 10 comprises a casing, including a relatively large circular mounting plate 15, a cylindrical body 20, and a circular cover plate 30, and a shaft 40 mounted in coaxial apertures in plates 15 and 30. All these parts, as well as stop 25 and vane 45, are of a ferritic alloy steel, such as Type 416 stainless steel.

Mounting plate 15 is formed with a series of countersunk apertures 11 receiving bolts 12 threaded into bores 21 of body 20. A pair of countersunk apertures 13 receive locating pins 14 seated in body 20. Around the periphery of plate 15 are apertures 16 to receive mounting bolts for the actuator. For a purpose to be described, plate 15 is formed with a pair of arcuately spaced apertures 17 which are countersunk and tapped as at 18.

Body 20 has secured to its inner surface the arcuate stop 25 having an axial length equal to that of body 20. The arcuately spaced ends of this relatively thick stop have shallow substantially rectangular recesses 22 forming axial spaced abutments 23, 23 at the end of each recess. Apertures 24, each coaxial with an aperture 17 in plate 15, extend through each of the abutments 23 adjacent plate 15, thus connecting the recesses 22 to apertures 17. The arcuate extent of stop 25 may be of the order of 90 degrees in a typical exemplary embodiment of actuator 10. Pins 26 and bolts 27 fixedly locate and position stop 25 on the inner surface of body 20, and secure the stop to the body, as best seen in FIG. 6.

Cover plate 30 has countersunk apertures 31 receiving locating pins 32 extending into apertures in body 20 and countersunk apertures 33 receiving securing bolts 34 threaded into passages 28 in body 20 and coaxial with passages 21.

Shaft 40 has substantially fluid tight bearing engagement in coaxial apertures 41 and 42 in plates 15 and 30, respectively, one end of the shaft being substantially flush with the outer surface of mounting plate 15. The other end 43 of shaft 40 extends beyond cover plate 30 and is splined, formed with a keyway, flattened, or otherwise appropriately formed for direct connection of the operated component thereto.

Between plates 15 and 30, shaft 40 has a bushing 44 thereon whose axial length is substantially equal to that of body 20. The vane 45, which may, in a particular example, have an arcuate extent of substantially 117 degrees is placed coaxially on bushing 44. The bushing and vane are positioned on shaft 40 by locating pins 46 and bolts 47. Bushing 44 has an outer diameter such that it has only running clearance with the inner arcuate surface of stop 25. Similarly, vane 45 has an outer diameter such that it has only running clearance with the inner surface of body 20.

Operating fluid under pressure is selectively applied to the arcuately spaced ends of vane 45 by means of nipples 35 screwed into threaded and countersunk portions 18 of passages, apertures, or ports 17 in plate 15. In turn, these ports communicate with ports 24 in stop 25, and thus with recesses 22. The fluid under pressure between adjacent ends of stop 25 and vane 45 rotates the vane and shaft 40 in a selected direction, the opposite recess 22 of stop 25 being at exhaust pressure.

As the leading edge of vane 45 approaches the "exhaust" edge of stop 25, its engagement therewith is cushioned by leaf springs 50 clamped to the arcuately spaced edges of vane 25 by clamp plates 51 and bolts 52, springs 50 having outwardly bent ends 53 engageable with abutments 23. Leakage of fluid around shaft 40 is inhibited by "Teflon" gaskets 55 seated in annular grooves 56, 57 in plates 15 and 30, respectively and engaging the ends of bushing 44. Due to the self-lubricating characteristics of the gaskets 55, there is substantially no resistance to rotation of vane 45 and shaft 40 even though the gaskets maintain a fluid tight seal inhibiting leakage around the shaft.

While stop 25 and vane 45 have been shown and described as positioned on and secured to body 20 and shaft 40, respectively, by means of locating pins and bolts and, in the case of vane 45, involving the bushing 44, it should be understood that this method of positioning and securement is exemplary only. For many applications, the stop and vane may be secured in position by brazing or welding techniques, for example. In the case of low torque actuators, shaft 40 and vane 45 can be machined from a single piece of metal.

While a specific embodiment of the invention has been shown and described in detail to illustrate the application of the invention principles, it will be understood that the invention may be embodied otherwise without departing from such principles.

What is claimed is:

1. A pressure fluid operated rotary actuator, for direct drive of a positionable component, comprising, in combination, a substantially cylindrical housing having coaxially apertured end walls; a shaft rotatably mounted in said end walls and projecting outwardly of at least one end wall for direct securement of a positionable component thereto; a radially extending vane, having a truncated sector shape radial section, secured to said shaft within said housing; said vane having an axial length substantially equal to the distance between said end walls and an outer radius substantially equal to the radius of the inner cylindrical surface of said housing; a radially extending stop, having a truncated sector shape radial section, secured to project inwardly from such inner cylindrical surface, said stop having an axial length substantially equal to the distance between said end walls and a radial extent substantially equal to that of said vane; means for introducing fluid under pressure between a selected one of the radial edges of said stop and radial edge of said vane; said vane extending from a tubular sleeve, telescopically secured on said shaft and having an axial length substantially equal to the distance between said end walls; means forming a fluid tight seal between the ends of said sleeve and said end walls; each radial edge of said stop having an elongated recess therein less than the axial length of the stop, the inner surface of each recess lying in a plane substantially parallel to a radial plane of said shaft and the side surfaces of each recess lying in planes perpendicular to the axis of said shaft; said fluid introducing means comprising a pair of substantially rectilinear passages each extending longitudinally through one end wall, substantially parallel to the shaft axis, and through the substantially rectangular abutments defining one end of each recess.

2. A rotary actuator as claimed in claim 1 including a pair of leaf spring each secured to extend axially of a radial edge of said vane and having outwardly bent ends engageable with the abutments defining the ends of said recesses.

References Cited in the file of this patent

UNITED STATES PATENTS

| | | |
|---|---|---|
| 695,006 | Stowell | Mar. 11, 1902 |
| 1,671,254 | Porter | May 29, 1928 |
| 1,717,699 | Lippert | June 18, 1929 |
| 1,974,775 | Gorsuch et al. | Sept. 25, 1934 |
| 2,025,573 | Collingham | Dec. 24, 1935 |
| 2,444,391 | Whitfield | June 29, 1948 |
| 2,633,105 | Lasater | Mar. 31, 1953 |
| 2,795,212 | Shafer | June 11, 1957 |
| 2,798,462 | Ludwig et al. | July 9, 1957 |
| 2,854,956 | Hager | Oct. 7, 1958 |